(No Model.)
W. D. FERGUSON.
Check Row Corn Planter.
No. 239,751. Patented April 5, 1881.
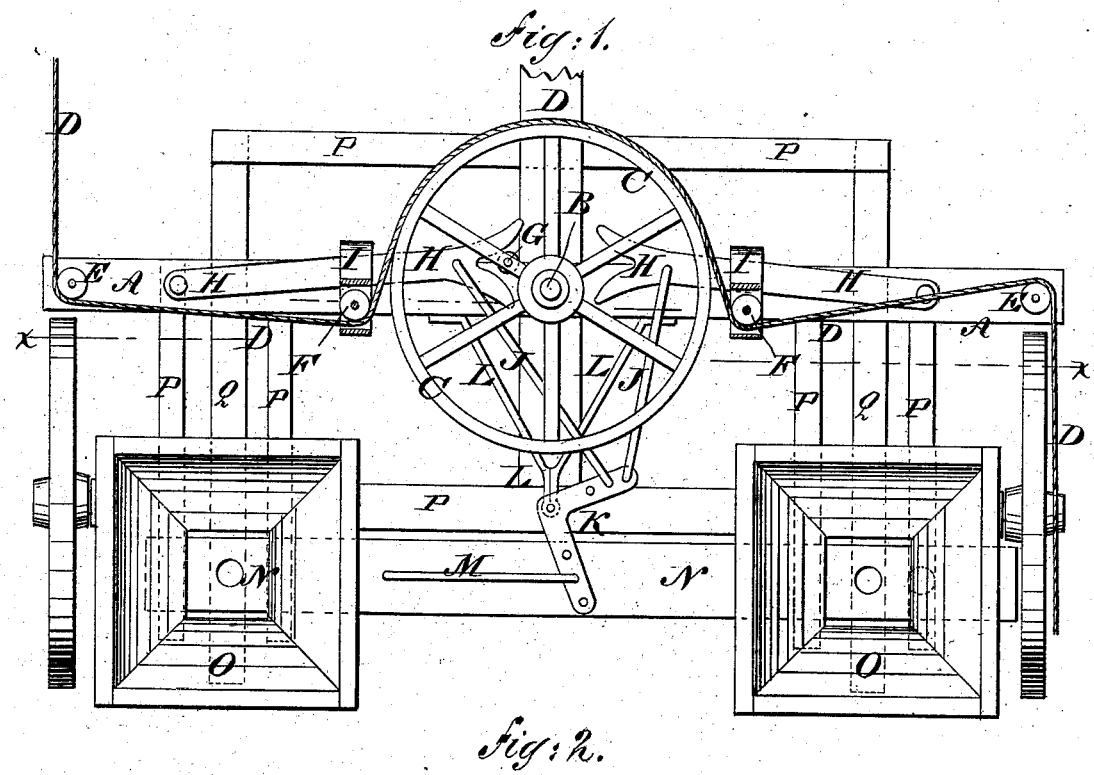
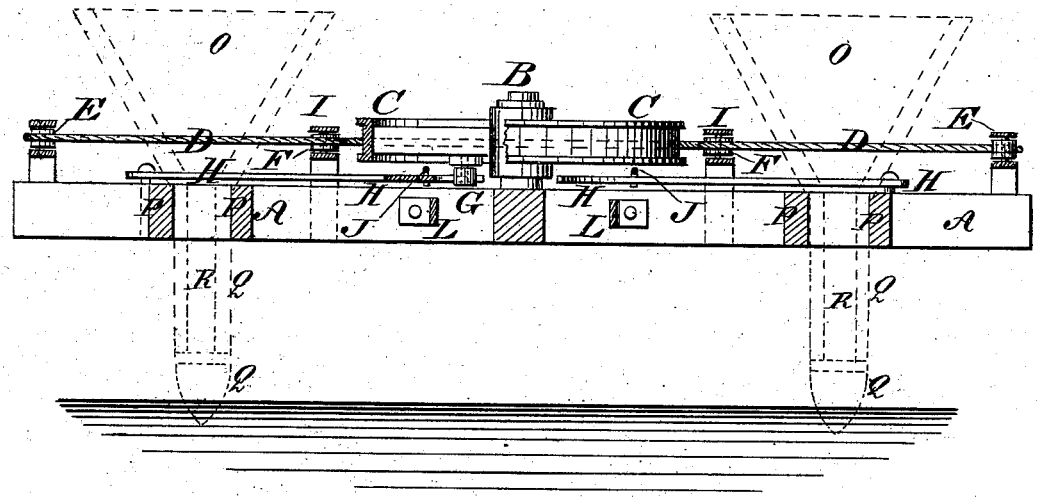
WITNESSES:
Chas. Nida.
C. Sedgwick.
INVENTOR:
W. D. Ferguson
BY Munn & Co
ATTORNEYS.

UNITED STATES PATENT OFFICE.

WILLIAM D. FERGUSON, OF BLUE MOUND, ILLINOIS.

CHECK-ROW CORN-PLANTER.

SPECIFICATION forming part of Letters Patent No. 239,751, dated April 5, 1881.

Application filed November 30, 1880. (No model.)

*To all whom it may concern:*

Be it known that I, WILLIAM D. FERGUSON, of Blue Mound, in the county of Macon and State of Illinois, have invented a new and useful Improvement in Check-Row Corn-Planters, of which the following is a full, clear, and exact description.

Figure 1 is a plan view of the improvement shown as applied to the seed-dropping bar of the planter. Fig. 2 is a rear sectional elevation taken through the line $x\ x$, Fig. 1.

Similar letters of reference indicate corresponding parts.

The object of this invention is to furnish check-row corn-planters of that class in which the seed-dropping slide receives motion from a rope stretched across the field, so constructed that they can be operated to drop the seed at uniform distances apart by means of a smooth rope.

A represents a cross-bar, which is designed to be attached to the frame P of the planter, at a little distance from the seed-hoppers O.

To the frame P are attached runners Q, for opening a channel to receive the seed, which seed is guided into the said channels by the spouts or tubes R, connected with the bottoms of the hoppers O in the ordinary manner.

To the center of the bar A is attached a spindle B, to which is pivoted a wheel C. The rim of the wheel C is grooved to receive the rope D, which is stretched across the field, and is secured at its ends to stakes set in the ground at the opposite sides of the field, in the ordinary manner. The rope D is made smooth or without the knots or buttons ordinarily formed upon or attached to the said rope. The rope D passes around guide-pulleys E, pivoted to the ends of the bar A, around guide-pulleys F, pivoted to the bar A, or to supports attached to the said bar at the opposite sides of the wheel C, and around one-half of the said wheel C, as shown in Fig. 1, so that the wheel C will be revolved by the friction of the rope D as the planter is drawn across the field.

To one of the spokes of the wheel C, at a little distance from the hub of the said wheel, is attached a pin, G, having a friction-roller placed upon it, which pin, as the wheel C is revolved, enters alternately the forks formed upon the inner ends of the two levers H, placed upon the cross-bar A. The levers H pass through keepers I, attached to the bar A at the opposite sides of the wheel C, and the outer ends of the said levers are pivoted to the bar A at a little distance from its ends.

To the levers H, at a little distance from their inner or forked ends, are pivoted the ends of two connecting-rods, J, the other ends of which are pivoted to an arm of the bent or angle lever K. The lever K is pivoted at its angle to a bracket, L, attached to the bar A, or to some other suitable support. To the other arm of the bent lever K is pivoted the end of a connecting-rod, M, the other end of which is pivoted to the slide-bar N, that removes the seed from the hoppers O, and drops it to the ground.

With this construction the pin G, that operates the forked levers H, is placed so near the center of the wheel C that a very little power applied to the rim of the said wheel C will be sufficient to move the said levers, so that the rope D will not be liable to slip upon the wheel C, and the seed will thus be dropped at uniform distances apart. With this construction, also, the two levers H, being connected with the same arm of the bent lever K, will both move at the same time and in the same direction, so that as one of said levers H is moved into such a position as to allow the pin G to pass out of its fork, the other lever H will be moved into such a position that the said pin G will enter the fork of the said lever H as the wheel C is revolved.

Having thus described my invention, I claim as new and desire to secure by Letters Patent—

The combination of a check-wheel carrying a push-pin and a friction-roll near the hub, levers provided with forks to receive the roller, two connecting-rods attached to forked levers, a bent lever, and a slide-bar connected with said bent lever, as described.

WILLIAM D. FERGUSON.

Witnesses:
WM. ELLIS,
HENRY Y. KREIDLER.